United States Patent [19]

Stone

[11] 4,081,693
[45] Mar. 28, 1978

[54] VEHICULAR PROPULSION SYSTEM

[76] Inventor: Gordon R. Stone, R.R. No. 1, O'Fallon, Ill. 62269

[21] Appl. No.: 597,031

[22] Filed: Jul. 18, 1975

[51] Int. Cl.² .......................... H02J 7/00; H02J 9/00
[52] U.S. Cl. ................................. 307/66; 180/65 R; 320/61; 429/19; 429/26
[58] Field of Search .................. 307/48, 56, 66, 80, 307/85–87; 136/100 R, 100 M, 86 B, 86 R; 123/119 E; 320/3, 43, 61, 8, 14; 336/140; 180/65 R, 65 A; 324/94; 429/22, 17, 29, 27; 73/445, 452; 204/1 H, 195 G, 248, 274

[56] References Cited

U.S. PATENT DOCUMENTS

| 1,618,894 | 2/1927 | Smock | 200/84 A |
|---|---|---|---|
| 2,384,463 | 9/1945 | Gunn et al. | 320/3 |
| 2,925,455 | 2/1960 | Eidensohn et al. | 136/86 R |
| 3,423,599 | 1/1969 | Hovious | 307/66 |
| 3,443,115 | 5/1969 | Timmerman, Jr. | 307/66 |
| 3,492,163 | 1/1970 | Hilmer | 136/86 R |
| 3,823,358 | 7/1974 | Rey | 307/66 |
| 3,850,695 | 11/1974 | Keller et al. | 136/86 B |
| 3,892,653 | 7/1975 | Pacheco | 136/100 M |

FOREIGN PATENT DOCUMENTS

| 2,100,040 | 2/1972 | France | 204/232 |

OTHER PUBLICATIONS

France Compagnie Generre d'Electricite, "A5KW Hydrogen-Air Fuel Battery with an Alkaline Electrolyte", Power Sources, 7th International Power Sources Symposium, Sept. 1970.

Primary Examiner—David Smith, Jr.
Attorney, Agent, or Firm—Koenig, Senniger, Powers and Leavitt

[57] ABSTRACT

A vehicular propulsion system comprising an electric drive motor and a source of electric power for energizing the motor drive. The power source comprises at least one fuel cell and at least one primary air cell. The air cell has a consumable replaceable anode and produces hydrogen as a product of the discharge reaction thereof. The fuel cell produces electrical energy when supplied with hydrogen. The hydrogen so produced by the primary cell is transmitted to the fuel cell. A switching arrangement is provided to alternately and selectively interconnect the fuel cell and primary air cell to the motor drive. The switching arrangement is responsive to the power output of the fuel cell whereby upon the power drain of the motor drive exceeding that available from the fuel cell, power will be supplied from the primary air cell.

8 Claims, 5 Drawing Figures

4,081,693

VEHICULAR PROPULSION SYSTEM

BACKGROUND OF THE INVENTION

This invention relates to vehicular propulsion systems and more particularly to such systems which utilize an electric motor drive.

The increasing awareness and concern regarding diminishing supplies of petroleum-based fuel, its rising costs and the pollutants and contaminants generated by internal combustion engines have heightened and emphasized the need for vehicular propulsion systems which do not require petroleum-based fuel nor cause pollution. Electrical motor driven vehicles powered by batteries would seem to meet these needs. Vehicles of this type have been known and used for many years but have enjoyed only limited acceptance and then only for relatively specialized uses. These vehicles, typically powered by secondary batteries, such as the conventional lead-acid battery, have not achieved success for a number of reasons. The relatively low energy density, both as to weight and volumetric aspects, the cost factors, the time and facilities needed to effect recharging and the limited cruising range have made wide-spread utilization of secondary batteries as a vehicular power source impractical for general use.

Other electrical power sources having increased energy density and perhaps some cost advantages over lead-acid batteries are zinc-air cell batteries and liquid electrode sodium-sulfur batteries. The former, as proposed, would be rechargeable with the zinc oxide produced during the discharge reaction being reduced and redeposited on the electrode during the recharging process. This recharging is time-consuming. Moreover, the filters and accessory equipment necessary to effect a rechargeable system poses substantial practical problems in adapting these batteries to wide-spread vehicular use. The liquid electrode type also has a markedly higher energy density, but the battery operating temperature is 250° – 300° C. and presents substantial problems in start-up from ambient temperatures.

Mechanically rechargeable batteries, i.e., those which are recharged by replacing an electrode consumed during the discharge reaction, and fuel cells are also known as electrical power sources but have not been adopted for general vehicular use for various reasons, including weight, costs and, in the case of fuel cells, the need to carry on board a supply of fuel, typically hydrogen.

U.S. Pat. No. 2,925,455 describes a continuous feed two-stage primary battery system in which the first stage generates hydrogen utilized by the second stage. However, the weight, cost and complexity of such a two-stage power supply with drive arrangements for continually feeding magnesium anode material to the first stage makes such a system impractical for mobile or vehicular use. Moreover, the cells of the first and second stage batteries are serially connected to provide power to the load, thus further increasing the complexity and difficulties in employing such a system for any mobile use.

Accordingly, the need continues for a practical vehicular propulsion system utilizing an on-board electrical power supply.

SUMMARY OF THE INVENTION

Among the several objects of this invention may be noted a vehicular propulsion system that is comparable in costs of construction and operation with internal combustion engines and yet utilizes no petroleum-based fuel nor produces any contaminants or air pollutants; the provision of such a system which utilizes a dual electrical power source in which the product of the discharge reaction of one source serves as fuel for the other power source; the provision of such a system which supplies sufficient electrical power to electrical motors to provide a vehicular cruising speed of 50 mph and an operating range of 300 miles; the provision of such a system in which the supplying of power to the electrical motor load is shared between the dual electrical power sources with the power source utilizing the fuel produced by the other source preferentially supplying this load; the provision of such a system in which the power source may be recharged inexpensively, conveniently and in a brief period of time; the provision of a vehicular propulsion system which requires no warm-up or start-up periods; and the provision of such a system which employs a primary air cell as one portion of a dual power supply and maintains the electrode activity of the air cell during discharge. Other objects and features will be in part apparent and in part pointed out hereinafter.

Briefly, a vehicular propulsion system of this invention comprises electric motor drive means and a source of electric power for energizing the drive means. The power source comprises at least one fuel cell and at least one primary air cell. The air cell has a consumable replaceable anode and produces hydrogen as a product of the discharge reaction thereof. The fuel cell produces electrical energy when supplied with this hydrogen. Means are provided for transmitting the hydrogen so produced by the primary cell to the fuel cell. Switching means alternately and selectively electrically interconnect the fuel cell and primary air cell to the drive means. This switching means is responsive to the power output of the fuel cell whereby, upon the power drain of the drive means exceeding that available from the fuel cell, power will be supplied from the primary air cell.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
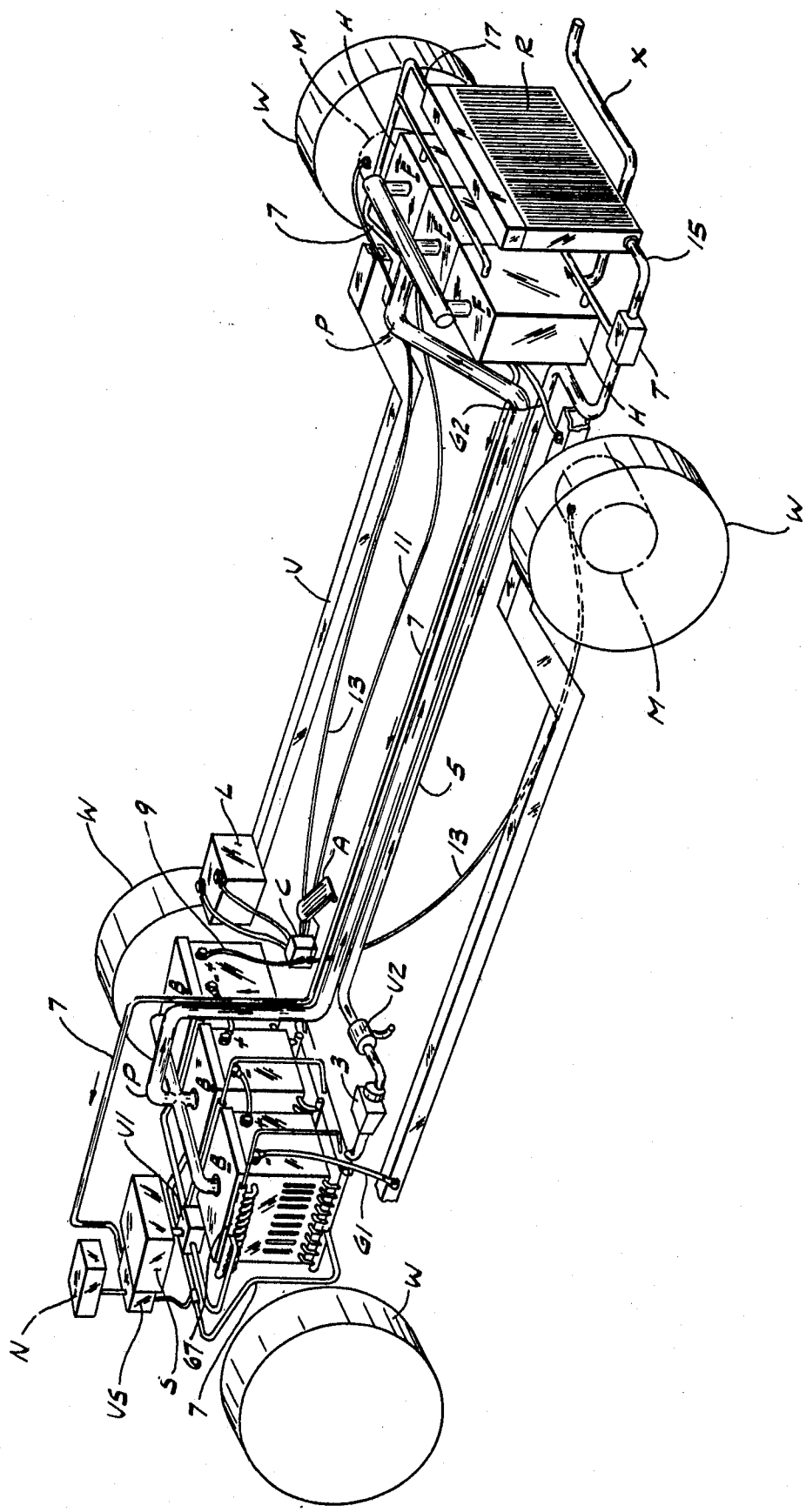
FIG. 1 is a trimetric pictorial-schematic view of a vehicular propulsion system of this invention.

Referring now to the drawings and more particularly to FIG. 1, a vehicular propulsion system of the present invention is shown mounted on the frame of a vehicle V, at least two wheels W of which are driven by electric motors M. A dual source of electric power for the drive motors M is constituted by three air-cell batteries B mounted, for example, in the forward portion of the vehicle, and three fuel cells F positioned in the aft portion thereof. The air cell batteries during operation, and as a product of their discharge reaction, produce hydrogen gas which is supplied to the fuel cells by a line or conduit P. The battery electrolyte, which is heated during the exothermic discharge air-cell reaction, is circulated by means of a pump 3 via an electrolyte line 5 through a heat-exchanger H jacketing the fuel cells to transfer heat to these cells and thereby to cool the electrolyte for return to the batteries B via a line 7. The terminals of the batteries B with the indicated polarity are series-connected with a positive power cable 9 being connected from one end battery to a controller C. The negative terminal of the other end battery is grounded to the frame by cable G1. The three fuel cells are similarly serially connected with a ground cable G2 being connected to the vehicle frame and the positive terminal of the opposite end cell being interconnected to controller C by a cable 11. Electrical power supplied via cables 13 from controller C to motors M is varied in accordance with the positioning of an accelerator pedal A.

A conventional lead-acid storage battery L charged from the dual power source is provided to supply the usual vehicular accessory power loads. A thermostat T is connected in electrolyte line 5 to bypass heated electrolyte around heat-exchanger H and by means of a line 15 circulate it through a radiator R for supplemental electrolyte cooling for connection by line 17 to the return electrolyte line 7. The water vapor exhaust from the fuel cells is discharged by means of a tail pipe X. A reserve supply of fresh electrolyte is carried in a reservoir S, while a supply of acid is provided at N for metering by a metering solenoid valve and alkalinity sensor VS into the return circulated electrolyte. A float valve V1 senses any decrease in electrolyte level in batteries B and replenishes it to the desired level from reservoir S. Another valve V2 is provided in the discharge electrolyte line 5 downstream from the pump to discharge all the electrolyte from the system.

Figure 2:
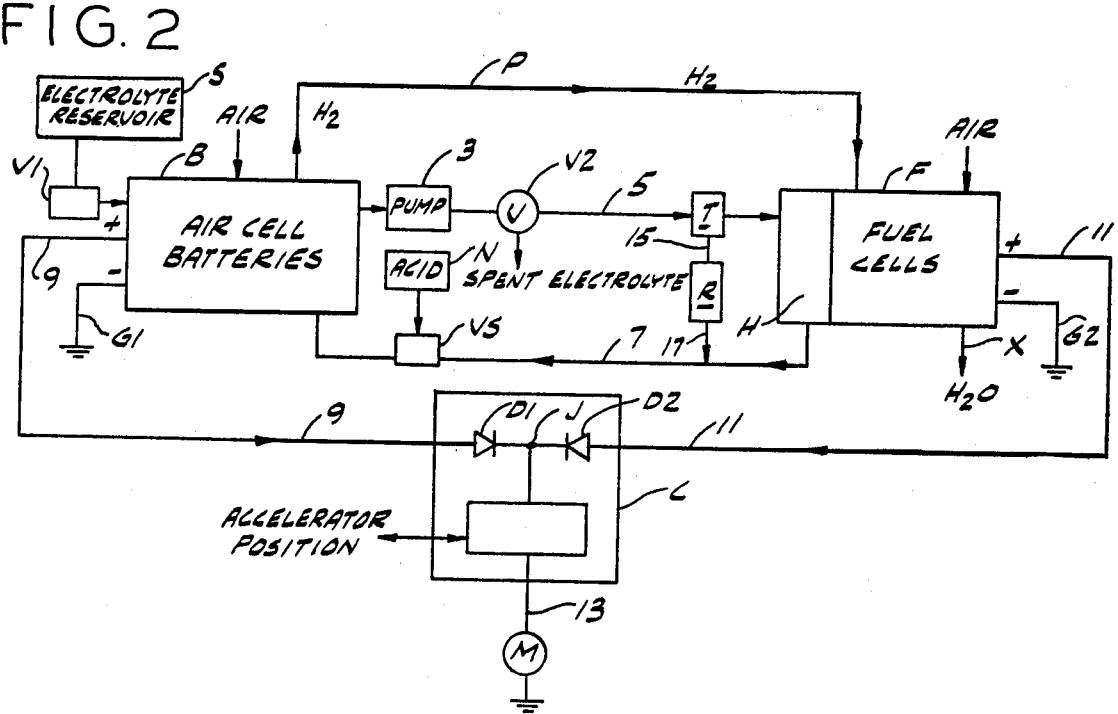
FIG. 2 is a block diagram-flow chart of the FIG. 1 system.

FIG. 2 illustrates by a flow chart the general interconnection and functioning of the vehicular power supply described generally above.

Figure 3:
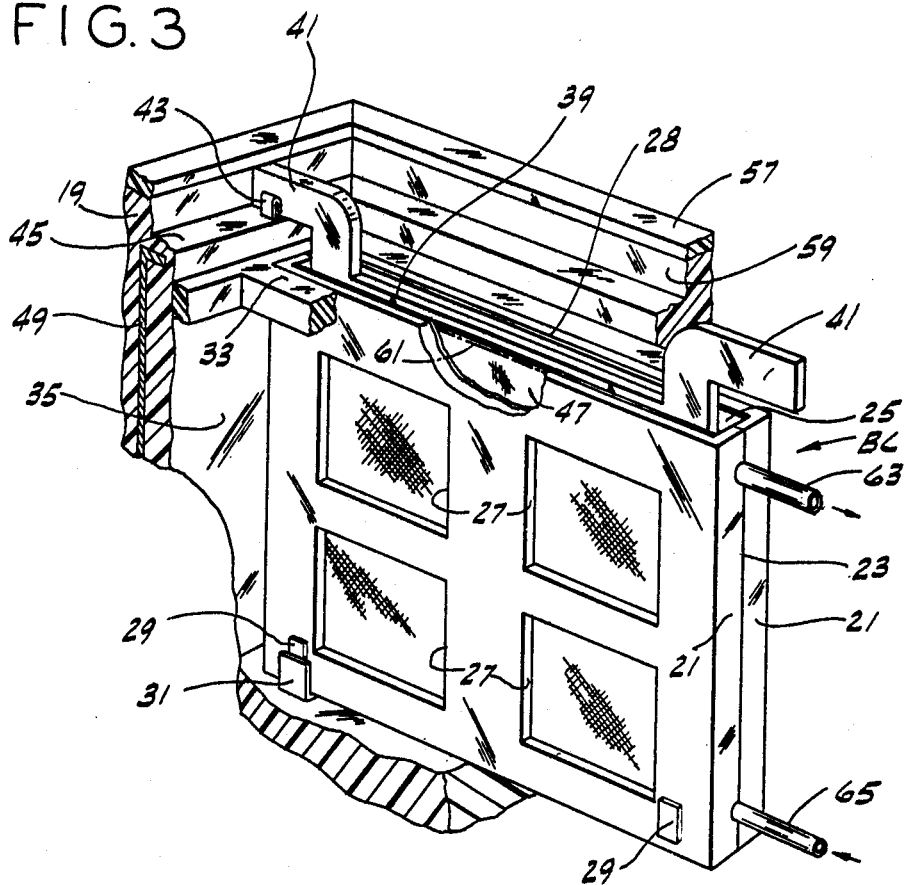
FIG. 3 is a trimetric cut-away view of one of the air cell batteries of the dual or composite power supply of the system of FIG. 1 showing one of the air cell components thereof.
Figure 4:
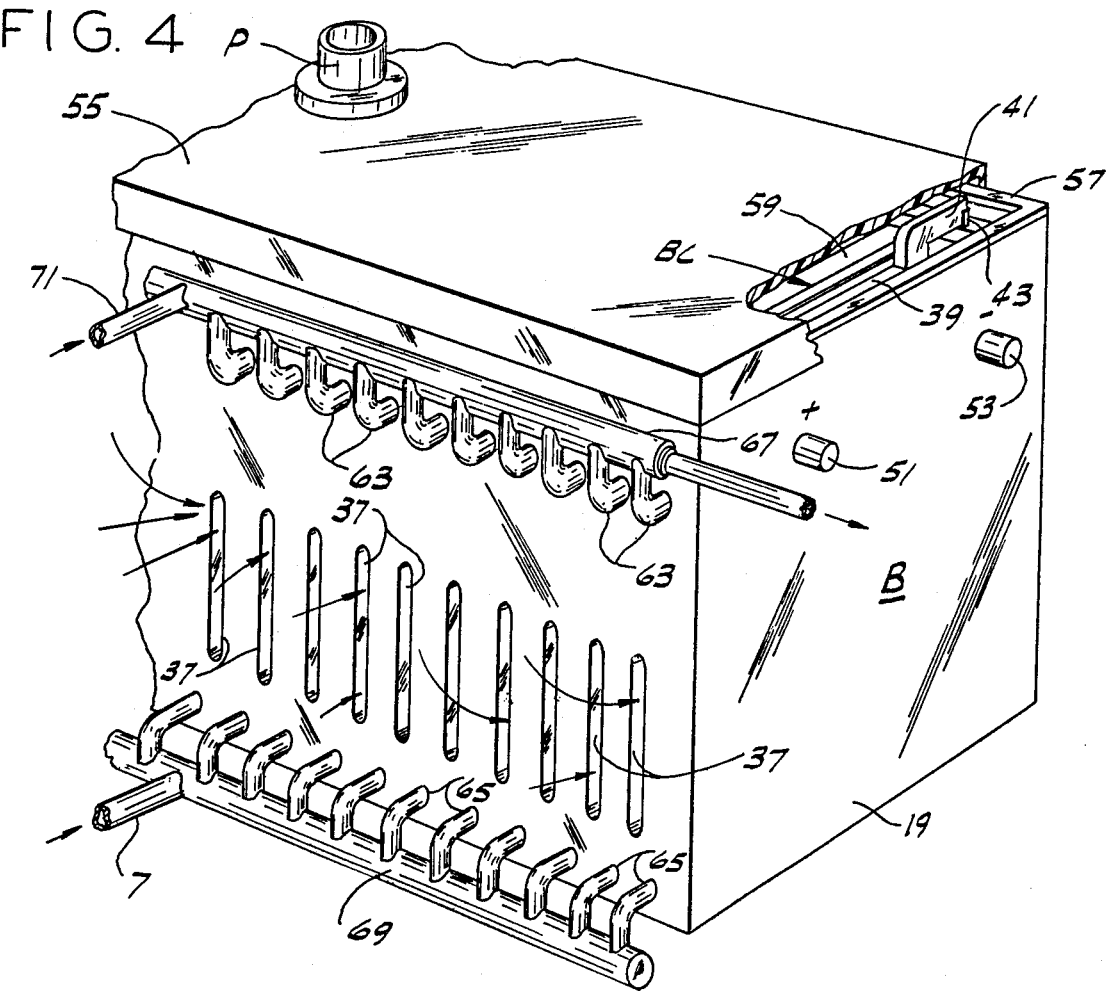
FIG. 4 is a trimetric cut-away view of one of the air cell batteries illustrating the exterior thereof.

Now more specifically describing the various components of a system of this invention, and as illustrated in FIGS. 3 and 4, each of batteries B comprises a number of primary air cells BC stacked side-by-side in a standard type battery container or case 19 fabricated, for example, of laminated fiber glass-reinforced epoxy resin. Each cell comprises a pair of half-shell frames 21 of a high strength synthetic resin material, such as a polysulfone, bonded together as indicated at 23 by solvent bonding or the like, to form a bicell cavity 25. Each half-shell frame has a number of vents or apertures 27. Secured by epoxy cement or other suitable bonding material to the inside surface of each frame 21 is an air cathode 28 constituted by an active carbon layer sandwiched between two current-collector grids of nickel screen. A sheet of microporous "Teflon" is secured to one grid to provide a hydrophobic inner cell surface. Such air cathodes and shells are available from ESB, Inc. of Yardley, Pa. These air cathodes 28 are air-permeable but electrolyte impermeable and are electrically commonly connected to exposed contacts 29 at the lower ends of each cell for sliding electrical engagement with spring clip terminals 31 secured to the inner bottom surface of case 19.

The cells BC are secured in spaced apart side-by-side positions by a slotted bulkhead 33 which is sealed at its outer periphery to the inner surface of case 19 near the top edge, and to the upper edges of each cell to form an air space 35 for free circulation of air via vent slots 37 molded in the sidewalls of case 19. An anode 39, preferably of magnesium or a commercial alloy thereof, is formed with two laterally extending arms 41. The outer ends of these arms are slidingly engaged in anode clips 43 mounted along a recessed ledge 45 formed along the top inner perimeter of battery case 19, thus cradling each anode for central suspension in each cell BC. Preferably the bottom inner surface of each cell has spaced bosses (not shown) molded therein to engage the lower edges of the anodes to keep them centered between the air cathode side walls of each cell. Optionally, but desirably, the body portion of each anode is enclosed in a loosely fitting sack 47 of a low porosity filtration fabric or polyester or the like, such as is commercially available under the trade designation "Feon" X BH-10G8-AXX from Ametek, East Moline, Ill. Adjacent cells BC are series-connected anode-to-cathode by electrical conductor strips 49 molded in the case walls. The cathode of one end cell is connected to a positive battery terminal 51 while the anode of the other end cell is connected to a negative battery terminal 53.

Each battery B is equipped with a cover 55 quick-detachably secured to the top of case 19 by conventional snap catches (not shown) which biases the inner surface around the periphery of cover 55 against a gasket 57 to form a sealed cavity 59 between the upper surface of bulkhead 33 and the cover. Each of the bicell cavities containing an anode 39 and a supply of aqueous electrolyte 61, such as sodium chloride solution (substantially saturated, e.g., 20–25% by weight NaCl), opens into or communicates with cavity 59 so that the gaseous reaction products, viz, hydrogen gas, of the discharge reaction of cells BC may be fed via conduit P to fuel cells F. Each cell is provided with an outlet tube 63 near its top and an inlet tube 65 near its bottom for circulation of the electrolyte. Each of tubes 63 communicates with an outlet manifold 67, while inlet tubes 65 are commonly connected to an inlet manifold 69. The lengths of each of these tubes 63 and 65 should be a minimum of 5–6 inches (12–15 cm.) to avoid any electrical shunting between series-connected cells BC.

Figure 5:
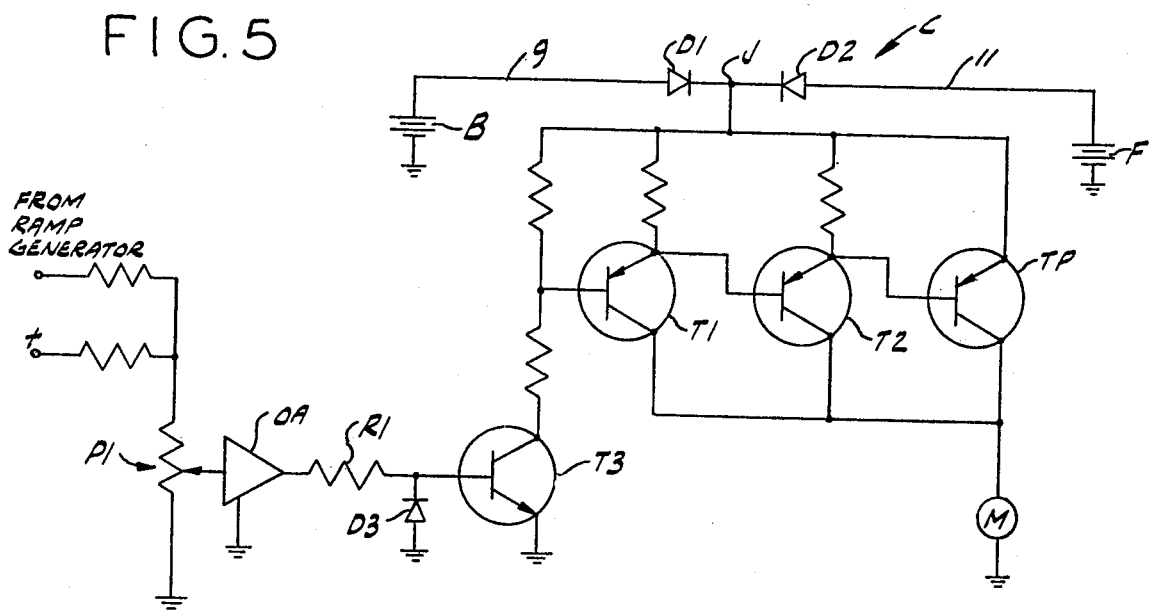
FIG. 5 is a circuit diagram of a solid-state controller for varying the amount of power supplied to the electric drive.

Referring now more particularly to FIG. 5, the positive terminal of the series-connected primary aircell batteries B and that of the series-connected fuel cells F are connected to a common electrical junction J via respective power diodes D1 and D2. The drive motor(s) M are supplied with electrical power from junction J via the emitter-collector circuit of a power transistor TP (several may be parallel-connected to accommodate the current drawn if this is more economical than using a single higher current transistor). The conductivity of TP is controlled by a signal supplied to its base by a direct-coupled amplifier constituted by two transistors T1 and T2 connected in a Darlington pair configuration. The input signal to the base of T1 is supplied by an operational amplifier OA, the output of which is coupled through a resistor R1 to a transistor T3, having a diode D3 connected from its base to ground, and which is cascade-connected therewith. A ramp signal is applied from a conventional ramp generator across a potentiometer P1 also connected to a d.c. voltage source, such as battery L. The amplitude of the ramp or sawtooth signal constituting a rider wave on this d.c. potential is controlled by the positioning of accelerator A mechanically linked to the rotor of potentiometer P1. Thus a ramp or sawtooth signal having an amplitude which is a function of the accelerator positioning is amplified by OA, T3, the Darlington pair and repetitively turns on and off power transistor TP, the proportion of "on" time or conductivity periods relative to the "off" periods thereof determining the magnitude of the electric power supplied to motor M from junction J. The repetition rate of the ramp generator is preferably quite rapid, e.g., 100 or more per second so that motor M is supplied with a series of pulses of d.c. of a period which is dependent on the positioning of the accelerator.

As will be described in more detail hereinafter, power is supplied to junction J alternatively and selectively from batteries B and fuel cells F. Briefly, whichever of these two power sources has the higher instantaneous potential will supply power to motor M. Diodes D1 and D2, typically silicon diodes, have a very low "forward" resistance and at a very low (e.g., 0.7 v.) voltage differential across such a diode in the forward direction, it will conduct fully.

Operation is as follows: Assuming the air cells B are not fully depleted and need mechanical recharging, operation of vehicle V may be initiated by the driver actuating the controller C by supplying 12 v.d.c. power and a ramp signal to potentiometer P1 and depressing accelerator A. As the no-load potential of air-cells B is applied via diode D1 to motors M in proportion to the conductivity periods of TP (determined by the positioning of A) motors M will be immediately energized and the applied voltage of cells B will drop in accordance with their regulation characteristics to a general operational level, for example, about 72 v. The exothermic discharge reaction in cells BC resulting from such energy drain will produce hydrogen gas at the cell anodes 29 which is supplied by conduit P to the fuel cells F. Initially these cells are producing no electrical energy. A typical cell F is available commercially from Engelhard Industries, East Newark, N.J. Such fuel cells have a nominal voltage of 24 v.d.c. Three such cells, each having a power rating of about 300 watts and a maximum rating of about 400 watts for up to 30 minutes, constitute exemplary fuel cells F. Power will not be fully available until proper warm-up of cells F. However, as the electrolyte 61 is heated by the air cell discharge reaction and is circulated by pump 3 through heat exchangers H, this will heat fuel cells F and with hydrogen gas supplied thereto these fuel cells will develop a no-load potential that will exceed the exemplary 72 v. potential applied to junction J by air cell batteries B. As soon as the potential supplied by cable 11 to diode D2 exceeds that at junction J by 0.7 v., D2 will conduct so that substantially all electrical power then supplied to motors M by power transistor TP is provided by fuel cells F. As soon as the load is thus applied to the fuel cells, the terminal voltage of these cells will drop accordingly to their regulation characteristics until the instant their level falls below the point where the voltage is supplied to junction J is less by 0.7 v. than that supplied by air-cells B. The electrical load constituted by motors M is then instantaneously transferred to air cells B which will then generate increasing amounts of hydrogen under load while fuel cell F operating without load increases its output potential. Thus, there is a rapid alternating of the two power sources in supplying the electrical load requirements of motors M, with the fuel cells F, after reaching their operating temperature range supplying the maximum amount of power consistent with the hydrogen fuel supplied from the air cells B.

The fuel cells F must be supplied with about 750 liters of hydrogen/Kwh power output and with the hydrogen at a slight positive pressure of about 0.12 psi over ambient atmospheric pressure. After the fuel cells reach their operating temperature, additional electrolyte cooling is provided by radiator R with thermostat T proportioning the flow of heated electrolyte between the first cell heat exchanger H and radiator R.

During operation the magnesium anodes 39 are consumed by the discharge reaction producing magnesium hydroxide and about 147 liters of hydrogen/per pound consumed. In order to provide for good operating efficiency and to make mechanical recharging more convenient, it is preferred that the magnesium hydroxide, which is insoluble in the electrolyte, be confined in anode sack 47 so that it is physically removed with the anodes. It will be understood that a filter may be interposed in the electrolyte circulation system and periodic removal of the hydroxide thus entrapped be effected by simply replacing or cleaning the filter. It is preferred that the magnesium hydroxide reaction product be decreased by adding sulfuric acid from supply N to the circulating electrolyte. This is conveniently accomplished by sensing the pH thereof directly or indirectly and metering the acid into the electrolyte to maintain a desired level (e.g., 7.0). The pH may be sensed directly by a conventional pH meter to actuate metering solenoid valve VS to add an appropriate number of drops of acid to the electrolyte. Alternately a coulometer may be used to monitor the power output of the air cells B relative to time, with acid metered into the circulatory system in proportion to the coulombs supplied. The electrolyte level in the air cells B is continuously sensed by float valve V1, intermittently opening to admit sufficient fresh electrolyte from reservoir S via a tube 71 to manifold 67 to maintain the desired level.

When the magnesium anodes 39 have been sufficiently consumed, the air cells B are mechanically recharged. This is accomplished by removing covers 55 and lifting the depleted anodes 39, with their enclosing sacks 47 with the entrapped magnesium hydroxide reaction product, from the cells BC and discharging, by operation of pump 3 and valve V2, the spent electrolyte. The magnesium values in the electrolyte, magnesium hydroxide and spent anodes may be recovered and recycled, if desired. New electrode assemblies are then positioned in the cells BC, the covers 55 replaced, and a fresh supply (typically about 30 gallons plus a 5 gallon reserve) of substantially saturated sodium chloride solution is provided for the air cells.

The anodes 39, as noted above, may be substantially pure magnesium or an alloy such as that commercially available under the trade designation "AZ31B" from Dow Chemical Co. which contains 96% magnesium, 3% aluminum and 1% zinc. Typically each anode 39 may be 0.1 to 0.15 inches (0.25-0.38 cm.) thick and have an area of 120-145 in.$^2$ (780-930 cm.$^2$), for a total of about 60 lbs. (30 kg.) per a 72 v. set of air cell batteries B. It will be understood that six 12 v. batteries B may be used rather than three 24 v. ones, as illustrated, or that other voltage levels such as 24 v. or 60 v. may be utilized, simply by series and parallel connection of the various cells to meet the particular voltage and power requirements established.

As also stated above, motors M may be series-wound d.c. motors, or a single such motor may be used to drive through a differential one set of wheels, front or rear, or four separate motors may be used, one for each wheel if four-wheel drive is desired. Depending on the vehicle weight, and cruising and maximum speed requirements, motors M may be as low as 2 hp. or much higher, if desired.

By way of further description of the vehicular propulsion system of this invention, the air cells at rest or without load will have a total anode depletion rate of only 0.05 lbs./hr., and will produce during operation approximately 659 whr. of power (based on a 65% air cell efficiency) per pound of magnesium anode consumed. The hydrogen produced by the air cells per pound of magnesium (147 liters at 0.12 psig) will supply the fuel cells with sufficient fuel to generate 196 whr., for a total system power of 855 whrs. per pound of magnesium. As the anodes will be approximately 70% utilizable before mechanical replacement or recharging, the power typically available from the air cells between anode replacements is 27.7 kwhr. and produce sufficient hydrogen to provide the fuel cells with sufficient fuel to produce about 8.23 kwh. of electrical power. That is, about 35.9 kwhr. of electrical power will be produced by a vehicular power system per 42 lbs. of magnesium anode material consumed.

Such a vehicular power supply will weigh approximately 700 lbs. while a typical vehicle carrying this supply will weigh about 1300 lbs. To drive such vehicle at a cruising speed of about 50 mph will require about 3500 w. The air cells will produce 2698 whr. per 4.09 lbs. of magnesium consumed and produce enough hydrogen for the fuel cells to generate 802 whrs., the fuel cells thereby providing about 23% of this power at cruising speed. Therefore, at cruising speeds of about 50 mph the magnesium anodes will provide sufficient energy for about 10 hours of operation or a range of 500 miles between replacements. However, the electrolyte may be replaced about every 300 miles or so.

At higher speeds, e.g., 60 mph, approximately 4800 w. will be needed to supply power to the electric drive motors. This will require about 5.6 lbs. of magnesium per hour to produce 3700 whr. of power from the air cells which in turn will supply about 825 liters of hydrogen to the fuel cells to produce about 1100 whr. of fuel cell power. Thus at such higher speeds such an exemplary power supply of this invention will provide over 10 hours of operation between recharging by anode replacement. This replacement requires about 10 minutes.

The air cells of such an exemplary system will provide up to 67 amps at 72 v. or 4800 w. sufficient to supply enough power to the drive motors to operate at higher than cruising speeds without any contribution by the fuel cells.

This will produce sufficient hydrogen to produce 1427 w. of fuel cell power, somewhat in excess of the 1200 w./cell maximum capacity of the exemplary fuel cells noted above. Thus a larger capacity fuel cell supply may be utilized if it is desired to match the maximum fuel cell capacity to that of the air cells.

It will be understood that the air cells may be supplied with air at ambient pressures or blowers to provide a forced air supply may be utilized. Also, it is preferred that the fuel cells be provided with means to exhaust the water reaction products as a liquid as well as solely as water vapor. While no system for charging the storage battery L has been shown, it will be understood that any conventional regulator system for maintaining the charge of this battery from the fuel and air cells may be utilized. Similarly, it will be understood that although not illustrated the vehicle is provided with electrical or mechanical means for reverse drive. Further, the power supply could, if desired for some reason, include supplemental secondary batteries and/or a supplementary hydrogen supply.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A propulsion system for a wheeled vehicle comprising electric motor drive means for driving wheels of the vehicle and a source of electric power for energizing said drive means, said power source comprising at least one fuel cell and at least one primary air cell utilizing a liquid electrolyte which is heated during the discharge reaction of the primary cell, said air cell having a consumable replaceable anode and producing hydrogen as a product of the discharge reaction thereof, said fuel cell adapted to produce electrical energy when supplied with hydrogen, means for transmitting the hydrogen so produced by the primary cell to the fuel cell, means in heat-exchange relationship with said fuel cell, means for recirculating the heated electrolyte through the heat-exchange means thereby to cool said primary cell and heat said fuel cell, a radiator through which the heated electrolyte may be recirculated when its temperature exceeds a predetermined level, switching means adapted alternately and selectively to electrically interconnect the fuel cell and primary air cell to the drive means, said switching means being responsive to the power output of the fuel cell whereby upon the power drain of the drive means exceeding that available from the fuel cell power will be supplied from the primary air cell, said switching means including means responsive to the relative output potentials of the fuel and air cells to interconnect the primary air cell to the drive means for only so long as the fuel cell potential remains below a certain level and is responsive to a rise thereabove to disconnect said primary cell and reconnect the fuel cell to the drive means, the switching means comprising a pair of diodes, two like electrodes thereof being commonly connected to the drive means, and the other electrodes thereof being respectively connected to said primary air cell and the fuel cell, means for sensing increasing alkalinity of said electrolyte during operation of the primary air cell, means responsive to said sensing means to supply an acid to said electrolyte to control the pH of the electrolyte to a desired level, and means for varying the amount of electrical power supplied from said power source to said drive means thereby to control the speed of the vehicle.

2. A system as set forth in claim 1 wherein the sensing means is a coulometer which indirectly senses the increasing alkalinity of the electrolyte as a function of the elapsed time of operation of said primary air cell.

3. A system as set forth in claim 1 wherein the sensing means is a pH meter.

4. A system as set forth in claim 1 wherein the anode of the primary cell comprises magnesium.

5. A system as set forth in claim 4 wherein the primary cell utilizes a liquid electrolyte and the anode thereof is encompassed by a fabric envelope permeable to the passage of electrolyte but substantially impermeable to the passage of magnesium hydroxide formed at the anode as an electrolytic reaction product during operation of the primary air cell.

6. A system as set forth in claim 5 which further includes a reservoir for said electrolyte and means responsive to a decrease in electrolyte level in said primary air cell to replenish the electrolyte therein from said reservoir.

7. A system as set forth in claim 1 which further includes solid-state means for controlling the supply of electric power to said drive means.

8. A system as set forth in claim 1 in which the electrolyte is an aqueous solution of sodium chloride.

* * * * *